US009012670B2

(12) United States Patent
Arakawa

(10) Patent No.: US 9,012,670 B2
(45) Date of Patent: Apr. 21, 2015

(54) METHOD OF MANUFACTURING WATER REPELLENT FILM AND THEREBY MANUFACTURED WATER REPELLENT FILM

(71) Applicant: FUJIFILM Corporation, Tokyo (JP)

(72) Inventor: Takami Arakawa, Kanagawa (JP)

(73) Assignee: FUJIFILM Corporation (JP)

( * ) Notice: Subject to any disclaimer, the term of this patent is extended or adjusted under 35 U.S.C. 154(b) by 206 days.

(21) Appl. No.: 13/753,379

(22) Filed: Jan. 29, 2013

(65) Prior Publication Data

US 2013/0197255 A1 Aug. 1, 2013

(30) Foreign Application Priority Data

Jan. 30, 2012 (JP) ................................ 2012-016924

(51) Int. Cl.

| | |
|---|---|
| ***C07F 7/02*** | (2006.01) |
| ***B05D 1/00*** | (2006.01) |
| ***B05D 5/08*** | (2006.01) |
| ***B41J 2/14*** | (2006.01) |
| ***B41J 2/16*** | (2006.01) |
| *B05D 1/18* | (2006.01) |

(52) U.S. Cl.

CPC .. *B05D 1/60* (2013.01); *B05D 5/08* (2013.01); *B05D 1/185* (2013.01); *B41J 2/14233* (2013.01); *B41J 2/1606* (2013.01); *B41J 2202/03* (2013.01)

(58) Field of Classification Search

CPC ...... B05D 1/60; B41J 2/14233; C03C 17/245

USPC ................................................. 556/400, 483

See application file for complete search history.

(56) References Cited

U.S. PATENT DOCUMENTS

| | | | | |
|---|---|---|---|---|
| 6,331,329 | B1 * | 12/2001 | McCarthy et al. | ............ 427/387 |
| 6,991,826 | B2 | 1/2006 | Pellerite et al. | |
| 2010/0053269 | A1 | 3/2010 | Fujii et al. | |

FOREIGN PATENT DOCUMENTS

| | | | |
|---|---|---|---|
| JP | 2000-328230 | A | 11/2000 |
| JP | 2003-014904 | A | 1/2003 |
| JP | 2005-262471 | A | 9/2005 |
| JP | 2006-291266 | A | 10/2006 |
| JP | 2006-348376 | A | 12/2006 |
| JP | 2007-533448 | A | 11/2007 |
| JP | 2007-332433 | A | 12/2007 |
| JP | 2009-220396 | A | 10/2009 |
| JP | 2010-076422 | A | 4/2010 |

OTHER PUBLICATIONS

An Office Action; "Notification of Reasons for Rejection," issued by the Japanese Patent Office on Dec. 13, 2013, which corresponds to Japanese Patent Application No. 2012-016924 and is related to U.S. Appl. No. 13/753,379; with English language partial translation.

* cited by examiner

*Primary Examiner* — Sudhakar Katakam
*Assistant Examiner* — Pancham Bakshi
(74) *Attorney, Agent, or Firm* — Studebaker & Brackett PC

(57) ABSTRACT

A method of manufacturing a water repellent film includes, before a formation step of forming an organic film on a substrate using a silane coupling agent by a vapor phase deposition method under film formation conditions, a step of specifying the film formation conditions using a test substrate of a same material as the substrate used in the formation step. The film formation condition specifying step includes: specifying film formation temperature to be not lower than a temperature at which the silane coupling agent evaporates and to be lower than a temperature at which the silane coupling agent bumps; and forming an organic film of the silane coupling agent on the test substrate at the specified film formation temperature, measuring by optical microscopic observation a time at which a bead of surplus water repellent material is formed, and specifying the film formation duration to be shorter than the measured time.

7 Claims, 5 Drawing Sheets

METHOD OF MANUFACTURING WATER REPELLENT FILM AND THEREBY MANUFACTURED WATER REPELLENT FILM

BACKGROUND OF THE INVENTION

1. Field of the Invention

The present invention relates to a method of manufacturing a water repellent film and a thereby manufactured water repellent film, and more particularly to a method of manufacturing a water repellent film by means of vapor phase deposition and a thereby manufactured water repellent film.

2. Description of the Related Art

An inkjet head used in an inkjet recording apparatus has a nozzle plate formed with nozzles, through which droplets of ink are ejected and deposited onto a recording medium to form an image on the recording medium. If the ink has adhered to a surface of the nozzle plate (hereinafter referred also to as a "nozzle face"), the adhering ink affects droplets of the ink ejected through the nearby nozzle, and deviations may occur in ejection directions of the ink droplets. Thus, in the state where the ink has adhered to the nozzle face, it is difficult to deposit the ink droplets at prescribed positions on the recording medium and this causes deterioration of the formed image.

Therefore, in order to prevent ink adhering to the surface of the nozzle plate and to thereby improve ejection properties of the inkjet head, it has been proposed to form a water repellent film on the surface of the nozzle plate.

A water repellent coating of a silane coupling agent is known as a high-adhesive water repellent film. Conventionally, the method generally used to form the water repellent film of the silane coupling agent is a dipping method, in which a silane coupling material is dissolved in a fluoric solvent while adjusting the concentration thereof to about 0.1 wt %, and a substrate is immersed in this solution and then drawn out and dried.

However, in recent years, there have been many cases where it has not been possible to immerse substrates in the solution in order to form the water repellent films, because the substrates on which the water repellent films are to be formed have no resistance to the solvent used. In these cases, the silane coupling material is applied to the substrates to form the films by means of a gas phase method (vapor phase deposition method).

For example, Japanese Patent Application Publication Nos. 2006-291266, 2007-533448, 2000-328230 and 2009-220396 describe methods of forming films of fluoric water repellent materials by means of vapor phase deposition.

Furthermore, the nozzle face of the inkjet head needs to be wiped to maintain ejection stability of the inkjet head. There is a problem in that if an excessive amount of water repellent material has been deposited on the nozzle face, the surplus water repellent material is liable to be removed when the nozzle face is rubbed by wiping, and the like, and then the removed material blocks the nozzles. Therefore, Japanese Patent Application Publication No. 2009-220396 describes that recess sections are formed on the nozzle face so that surplus water repellent material collects in the recess sections, thereby preventing blockage of the interior of the nozzles. Japanese Patent Application Publication No. 2005-262471 describes that water repellent material having weak bonds is beforehand removed by means of an adhesive tape.

SUMMARY OF THE INVENTION

Japanese Patent Application Publication Nos. 2006-291266 and 2007-533448 describe the film formation methods in which the fluoric compounds including perfluoropolyether are used as the water repellent materials and the film formation temperature is around 100° C. It is known from TG-DTA (thermogravimetric and differential thermal analysis) measurements that these water repellent materials having large molecular weights evaporate slowly at a temperature of 300° C. to 600° C. Therefore, at about 100° C., the vapor pressure of the water repellent material is extremely low, due to the low temperature, the film formation duration is then long, and in the case of the method in Japanese Patent Application Publication No. 2006-291266, the film formation takes two hours.

Japanese Patent Application Publication No. 2000-328230 describes that the film formation (vapor phase deposition) is carried out while adjusting the output of a heat source and the film thickness is controlled through measurement by means of a quartz-crystal resonator. However, the monomolecular film to be formed has a thickness of around 1 nm to 8 nm, and it is then very difficult indeed to control the film thickness. Moreover, it is also described that bumping of the water repellent material occurs during heating. It is then difficult to control the film thickness in the case of film formation at high temperatures. Japanese Patent Application Publication No. 2009-220396 describes forming a film of Optool DSX, which is a water repellent material, at about 400° C., but also describes that the film formation is possible at room temperature to 200° C., and hence a suitable evaporation temperature of the water repellent material is not clear.

Japanese Patent Application Publication No. 2009-220396 also describes that the recess sections are arranged so as to collect surplus water repellent material; however, forming the recess sections leads to increased costs, and there is also a problem in that the surplus water repellent material which cannot be completely retained in the recess sections blocks up the nozzles and shortens the lifespan of the inkjet head. Japanese Patent Application Publication No. 2005-262471 describes that the water repellent material having weak bonds is removed by means of an adhesive tape; however, with this method, there is a possibility that fully bonded water repellent film can also become detached, and there is also a problem in that the adhesive agent on the adhesive tape transfers and remains on the water repellent film, degrading the water repellent properties, or depending on the conditions, the water repellent material having weak bonds is not removed sufficiently.

Japanese Patent Application Publication No. 2000-328230 describes to control the film thickness by measuring a weight of the film material that has been deposited on the quartz-crystal resonator. The film thickness can be also estimated by XRR (X-ray reflectivity) measurements. However, a film having a monomolecular structure is the basis of the water repellent film, and if measured by XRR, for example, both of the film to which surplus water repellent material is adhering and the film to which surplus water repellent material is not adhering appear to have the same thickness. This is thought to be because the film created when surplus water repellent material has been applied has a structure constituted of a monomolecular film, which is detectable by the XRR measurements, and adhering to this, molecules of the surplus water repellent material having random molecular orientations, which do not produce X-ray diffraction. Even if the film thickness is controlled by the method described in Japanese Patent Application Publication No. 2000-328230, it is impossible to distinguish between formation of a monomolecular film and deposition of surplus water repellent material, and the surplus water repellent material readily becomes detached and gives rise to nozzle blockages.

The present invention has been contrived in view of these circumstances, an object thereof being to provide a method of manufacturing a water repellent film having excellent chemical resistance and wiping resistance, and a water repellent film manufactured by the method.

In order to attain the aforementioned object, the present invention is directed to a method of manufacturing a water repellent film, comprising: an organic film formation step of forming an organic film on a substrate using a silane coupling agent by a vapor phase deposition method under film formation conditions including film formation temperature and film formation duration; and before the organic film formation step, a film formation condition specifying step of specifying the film formation conditions using a test substrate of a same material as the substrate used in the organic film formation step, wherein the film formation condition specifying step includes: a film formation temperature specifying step of specifying the film formation temperature to be not lower than a temperature at which the silane coupling agent evaporates and to be lower than a temperature at which the silane coupling agent bumps; and a film formation duration specifying step of forming an organic film of the silane coupling agent on the test substrate at the film formation temperature specified in the film formation temperature specifying step, measuring by optical microscopic observation a time at which a bead of surplus water repellent material is formed, and specifying the film formation duration to be shorter than the measured time.

According to this aspect of the present invention, the film formation conditions for the vapor phase deposition method in the organic film formation step are specified to be the optimal film formation temperature and film formation duration by carrying out film formation separately using the similar test substrate, then the formation of the organic film on the substrate is carried out, and it is possible to form a monomolecular film of high density having excellent wiping resistance and ink immersion resistance. Moreover, since there is no evaporation of surplus water repellent material, then it is possible to reduce the use of expensive water repellent material, and furthermore, since no beads of surplus water repellent material, which could be readily detached, are formed on the surface of the monomolecular film, then it possible to prevent a cause of nozzle blockages.

Preferably, the film formation temperature specified in the film formation temperature specifying step is a temperature at which weight decrease of the silane coupling agent is not less than 10% and not more than 90%, more preferably not less than 20% and not more than 80%, in thermogravimetric and differential thermal analysis measurement in which the temperature of the silane coupling agent is raised at a rate of 10° C. per minute.

According to this aspect of the present invention, the film formation conditions are achieved in which the silane coupling agent readily evaporates and is readily vapor-deposited onto the substrate, and therefore the water repellent film that is formed can be readily controlled.

Preferably, in the film formation duration specifying step, a static contact angle of water with respect to the organic film formed on the test substrate is measured, and the film formation duration is specified to be not shorter than a time at which the measured static contact angle is not smaller than 110°.

According to this aspect of the present invention, it is possible to impart sufficient water repellent properties.

Preferably, in the film formation duration specifying step, the film formation duration is specified to be a time immediately before the time at which the bead of surplus water repellent material is formed.

According to this aspect of the present invention, it is possible to form the monomolecular film with the high density and hence the wiping resistance and the ink immersion resistance can be improved.

Preferably, the method further comprises, after the organic film formation step, a storing step of storing the substrate for a prescribed time before use.

According to this aspect of the present invention, it is possible to improve the adhesive properties between the organic film and the substrate.

Preferably, in the storing step, the substrate is stored while controlling environmental temperature and humidity.

According to this aspect of the present invention, it is possible to further improve the adhesive properties between the organic film and the substrate.

In order to attain the aforementioned object, the present invention is also directed to a water repellent film manufactured by the above-described method.

According to this aspect of the present invention, the water repellent film can be formed with high density, and no beads of surplus water repellent material are formed on the surface. Therefore, it is possible to achieve sufficient water repellent properties, and nozzle blockages can be prevented.

According to the method of manufacturing the water repellent film according to the present invention, by carrying out the vapor phase deposition of the water repellent film under the suitable temperature condition for the suitable duration, it is possible to form the water repellent film with high density, and formation of beads of surplus water repellent material can be prevented. The water repellent film manufactured by this method of manufacturing is bonded without gaps in the water repellent film, and therefore it is possible to improve the chemical resistance and the wiping resistance. Furthermore, since no surplus water repellent film is formed, it is possible to improve the dynamic water repellent properties (droplet roll-off properties), and nozzle blockages due to wiping can be prevented.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein.

DESCRIPTION OF THE PREFERRED EMBODIMENTS

A method of manufacturing a water repellent film according to an embodiment of the present invention includes an organic film formation step of coating a substrate with an organic film functioning as a water repellent film by means of a vapor phase deposition method using a silane coupling agent, and a film formation condition specifying step of beforehand specifying film formation conditions in the organic film formation step. By specifying the film formation conditions in the film formation condition specifying step before the organic film formation step, it is possible to form a satisfactory film in the organic film formation step.

<Organic Film Formation Step>

Figure 1A:
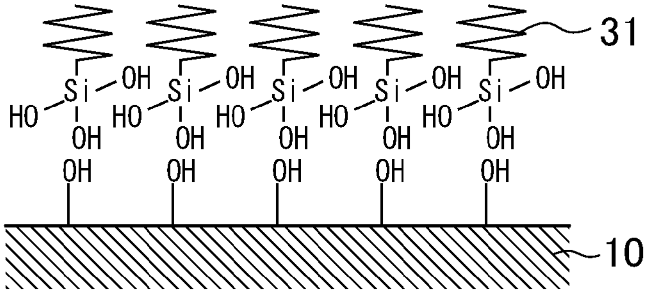
FIGS. 1A and 1B are diagrams illustrating a method of forming a water repellent film.
Figure 1B:
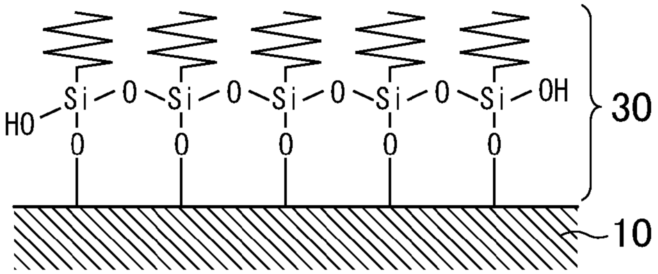

In the organic film formation step, an organic film is formed on a substrate 10 by vapor phase deposition of a silane coupling agent. FIG. 1A is a schematic diagram of chemical structures of the silane coupling agent 31 and the substrate 10 before bonding, and FIG. 1B is a schematic diagram of chemical structures after the boding, in which the organic film or water repellent film 30 has been formed on the substrate 10.

The substance of the substrate 10 for forming a silica film is desirably any of silicon, glass, metal, ceramic and polymer film. In the present embodiment, it is possible to form a strong water repellent film on the substrate made of any of silicon, glass, metal, ceramic or polymer film.

It is desirable that a substrate having a large number of OH groups on the surface is used as the substrate 10. With the silane coupling agent, OH groups on the surface of the substrate 10 and OH groups of the silane coupling agent 31 are dehydratively condensated and chemically bonded, and therefore if there are a large number of OH groups on the surface of the substrate 10, it is possible to form the film of the silane coupling agent 31 densely on the substrate 10.

For example, a brochure of Gelest, Inc. entitled "Gelest Silane Coupling Agents" describes desirable substrates having effectiveness with silane coupling agents, and it is known that materials containing $SiO_2$ (silica, quartz, glass), etc., have a large amount of SiOH. Moreover, in the case of substrates which readily produce natural oxide films on the surfaces, such as Si and Cu, the natural oxide films are liable to contain OH groups, and therefore such substrates are also desirable for use in the present embodiment.

Furthermore, it is possible to improve adhesion properties of the surface of the substrate with respect to the silane coupling agent by irradiating the surface of the substrate with energy, such as ultraviolet light, electron beam, oxygen plasma, or the like. This is thought to be because, in the case of the $SiO_2$ substrate for example, the irradiation removes organic contamination from the surface of the substrate, and also induces the following reaction:

$$\equiv Si—O—Si\equiv + H_2O \rightarrow \equiv Si—OH + OH—Si\equiv,$$

thereby activates the surface and increases the number of OH groups on the surface.

For the silane coupling agent 31, it is desirable to use a chlorine, methoxy, ethoxy or isocyanate functional silane, or the like.

The water repellent film 30 can be formed by a physical vapor growth method, such as a vapor phase deposition method. In the vapor phase deposition method, a substrate for film formation is placed in a vacuum chamber, a material of which a film is to be formed is vaporized in the vacuum chamber under vaporizing conditions (i.e., conditions which achieve a sufficient vapor pressure of the material), and the vaporized material is deposited onto the substrate to form the film of the material on the substrate. In the case of the silane coupling agent, it is common to use a method which forms a film by heating and vaporizing the silane coupling agent.

The method of manufacturing the water repellent film according to the present embodiment includes, before the organic film formation step, the film formation condition specifying step for specifying the film formation conditions in the organic film formation step. The film formation condition specifying step includes a temperature specifying step and a film formation duration specifying step.

<Film Formation Condition Specifying Step>

<<Temperature Specifying Step>>

In the temperature specifying step, the temperature condition to be set in the organic film formation step is specified so as to be not lower than the temperature at which weight decrease of the silane coupling agent starts to occur when the silane coupling agent heats up, and to be lower than the temperature at which bumping of the heated silane coupling agent starts to occur. The temperature condition can be specified by TG-DTA measurements, for example. More specifically, a solution of the silane coupling water repellent material is prepared, and the diluting solvent of the solution is evaporated off at room temperature until the weight decrease of the solution subsides and only the silane coupling water repellent material remains, and in this state, the temperature is raised at 10° C./min, then the temperature condition is specified desirably to be one at which the weight decrease becomes not less than 10% and less than 90%, and more desirably to be one at which the weight decrease becomes not less than 20% and less than 80%.

A temperature where the weight decrease is small according to TG-DTA measurement is not desirable because the amount of evaporation of the silane coupling agent is small and therefore film formation takes a long time. Furthermore, a temperature where the weight decrease is large according to TG-DTA measurement is undesirable because the amount of evaporation of the silane coupling agent is large and therefore it becomes difficult to control the film formation. If the film formation is carried out while the temperature is high, then beads of surplus water repellent material (silane coupling agent) are formed on the surface of a monomolecular film of the water repellent material in a state where the density of the monomolecular film is small (the coating ratio is low). The beads of the surplus water repellent material are liable to become detached easily, and therefore are detached by wiping and become a cause of nozzle blockages.

<<Film Formation Duration Specifying Step>>

In the film formation duration specifying step, the film formation duration to be set in the organic film formation step is specified. More specifically, the static contact angle of water with respect to the surface of the substrate covered with the water repellent film is measured when the film formation is carried out, and the film formation duration is specified so as to be not shorter than a time period at which this measured static contact angle becomes not smaller than 110°. Moreover, the water repellent film that has been formed is observed with an optical microscope, and a time period until immediately before a bead (island) of the surplus water repellent material is formed is estimated (predicted) previously under the same conditions. The film formation duration is specified so as to be shorter than this estimated time period, and it is desirable that the film formation duration is specified so as to be a time period until immediately before reaching this estimated time period. By adopting the film formation duration as described above, the water repellent film has water repellent properties exhibiting the static contact angle of not smaller than 110°, and since there is no surplus water repellent material, then it is possible to prevent detachment of the surplus water repellent material and the occurrence of nozzle blockages due to wiping. Further, it is possible to raise the coating ratio of the water repellent film by making the film formation duration longer in a state where no beads of the surplus water repellent material are formed, and therefore the film formation duration is desirably set to be a time period until immediately before a bead of the surplus water repellent material is formed.

Furthermore, by eliminating surplus water repellent material, it is possible to improve the dynamic water repellent properties (droplet roll-off properties) of the surface of the substrate covered with the water repellent film. It is thought that if the surplus water repellent material is present, then the beads of the surplus water repellent material have the effect of undulations to increase the frictional properties, and/or have hydrophilic groups projecting outward to create trapping points. Therefore, it is possible to improve the dynamic water repellent properties (droplet roll-off properties) by eliminating the surplus water repellent material.

The film formation duration varies with the amount of the silane coupling agent and the size of the substrate on which the film of the silane coupling agent is formed. Therefore, the substrates having Si—OH bonds are prepared by the same manufacturing method while changing the film formation duration and setting the same film formation conditions other than the film formation duration, and the film formation duration is specified by means of measurements of the static contact angles of water with respect to the surfaces of the substrates and observations of the surfaces with the optical microscope. By carrying out the film formation for the specified duration, no beads of the surplus water repellent material are formed, and the water repellent film having good chemical resistance and good resistance to wiping can be formed without carrying out post-processing.

Next, the silane coupling agents which can be used in the present embodiment are described. The silane coupling agents are silicon compounds represented as $Y_n\ SiX_{4-n}$ (n=1, 2 or 3), where Y includes a relatively inert group, such as an alkyl group, or a reactive group, such as a vinyl group, an amino group or an epoxy group, and X includes a group capable of bonding by condensation with a hydroxyl group or adsorption water on the substrate surface, such as a halogen, a methoxy group, an ethoxy group or an acetoxy group. The silane coupling agents are widely used in the manufacture of composite materials of an organic material and an inorganic material, such as glass fiber-reinforced plastics, in order to form a binding link at the interface between the materials. If the silane coupling agent has Y of an inert group, such as an alkyl group, then the silane coupling agent can prevent adherence to or abrasion of the modified surface and impart characteristics such as sustained gloss, water repellent properties, lubricating properties, and the like, to the modified surface. The silane coupling agent having Y of a reactive group is used principally to improve adhesion properties of the modified surface.

Moreover, the surface that has been modified by means of a fluorine type silane coupling agent having a straight-chain carbon fluoride chain introduced into Y has low surface free energy, like the surface of PTFE (polytetrafluoroethylene), and hence the characteristics, such as water repellent properties, lubricating properties, mold separation, and the like, are improved, and oil repellent properties are also exhibited.

Possible examples of straight-chain fluoroalkyl silane include Y of $CF_3CH_2CH_2$, $CF_3(CF_2)_3CH_2CH_2$, $CF_3(CF_2)_7CH_2CH_2$, or the like.

Moreover, the Y part can use material having a perfluoropolyether (PFPE) group ($—CF_2—O—CF_2—$).

Further, for the silane coupling agent, it is also possible to use a material $X_3SiYSiX_3$, in which silane coupling groups are arranged on both sides, rather than one side only.

Furthermore, it is also possible to use commercial silane-coupling water-repellent materials, such as Optool made by Daikin Industries, Durasurf made by Harves, Novec EGC1720 made by Sumitomo 3M, Fluorolink S-10 made by Solvay Specialty Polymers, Nanos made by T&K, Sifel KY-100 made by Shin-Etsu Chemical, Cytop Type M made by AGC, or the like.

FIG. 1A shows a state where X has been substituted by OH groups due to hydrolysis of the silane coupling agent 31. Thereupon, dehydrative condensation occurs between OH groups on the substrate 10 or mutually adjacent silane coupling agent 31, and the film having the structure shown in FIG. 1B can be formed.

<Storage Step>

After forming the water repellent film, desirably, the substrate is stored in air for a prescribed time period before the water repellent film is used. By storing the substrate in air, it is possible to further strengthen the tight adhesion between the base material and the water repellent film. It is desirable that the storage time period is not shorter than 1 week, and more desirably not shorter than 2 weeks. Furthermore, it is desirable that the water repellent film is stored under temperature-controlled and humidity-controlled conditions. By storing the substrate under the above-described temperature and humidity conditions, it is possible to further enhance the tight adhesion between the base material and the water repellent film.

<General Composition of Inkjet Recording Apparatus>

Next, a nozzle plate, an inkjet recording head including the nozzle plate and an inkjet recording apparatus are described as examples of application of the water repellent film manufactured by the method of manufacturing the water repellent film according to an embodiment of the present invention. The method of manufacturing the water repellent film according to the embodiment of the present invention is desirably used in a method of manufacturing the nozzle plate, a method of manufacturing the inkjet head, and a method of manufacturing the inkjet recording apparatus.

Figure 2:
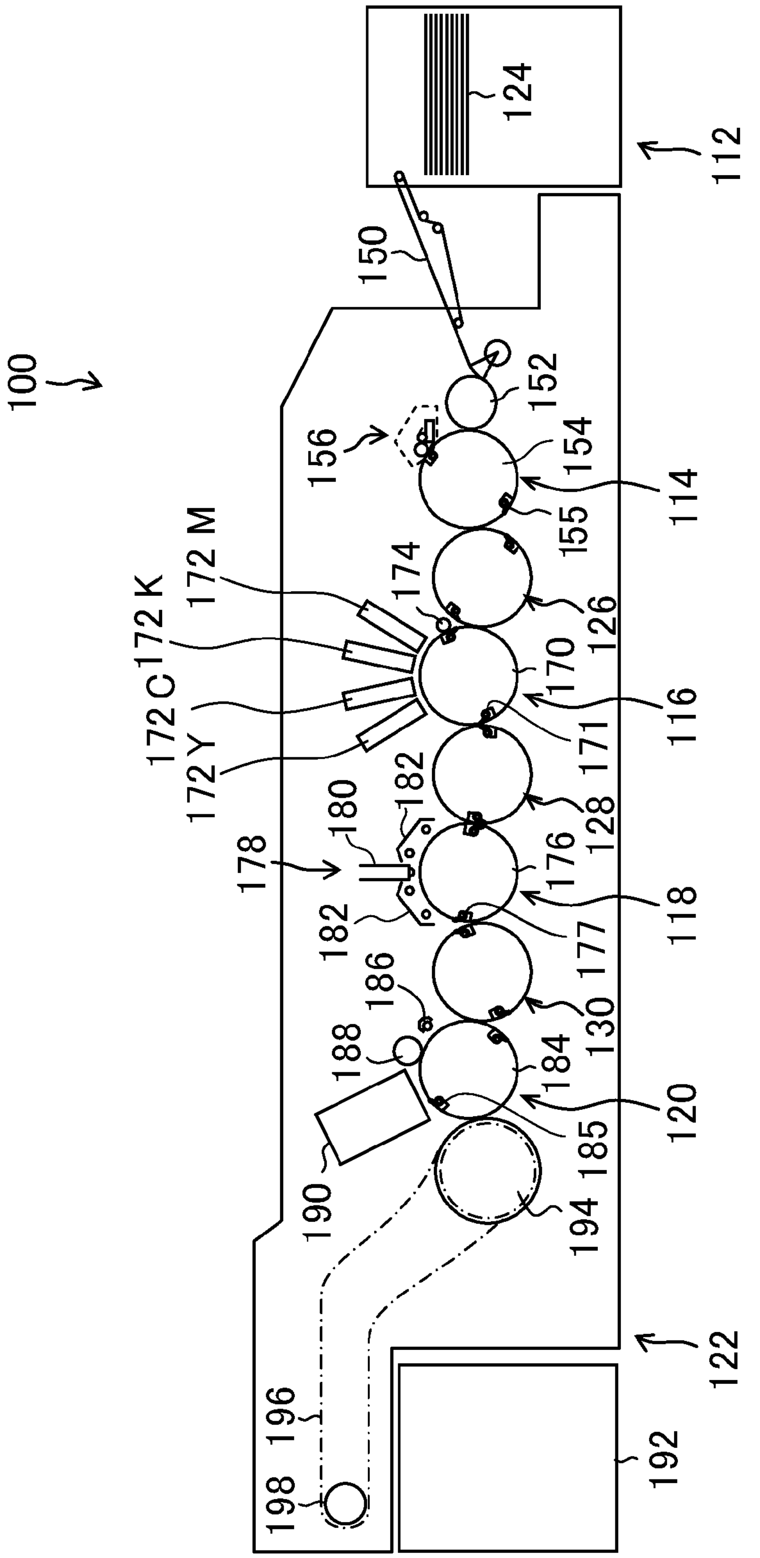
FIG. 2 is a general schematic drawing showing an inkjet recording apparatus.

FIG. 2 shows the composition of the inkjet recording apparatus. The inkjet recording apparatus 100 is an inkjet recording apparatus using a pressure drum direct image formation method, which forms a desired color image by ejecting droplets of inks of a plurality of colors from inkjet heads 172M, 172K, 172C and 172Y onto a recording medium 124 (also called "paper" for the sake of convenience) held on a pressure drum (image formation drum 170) of an image formation unit 116. The inkjet recording apparatus 100 employs a pressure drum direct image formation method, which forms a desired color image by ejecting and depositing droplets of inks of a plurality of colors (for example, magenta (M), black (K), cyan (C) and yellow (Y)) from the inkjet heads 172M, 172K, 172C and 172Y onto a recording medium 124 (hereinafter referred also to as "paper" for the sake of convenience) held on a pressure drum (image formation drum) 170 in an image formation unit 116. The inkjet recording apparatus 100 is an image forming apparatus of an on-demand type employing a two-liquid reaction (aggregation) method in which the image is formed on the recording medium 124 by depositing a treatment liquid (here, an aggregating treatment liquid) on the recording medium 124 before depositing the droplets of ink, and causing the treatment liquid and the ink liquid to react together.

As shown in FIG. 2, the inkjet recording apparatus 100 includes a paper feed unit 112, a treatment liquid deposition unit 114, the image formation unit 116, a drying unit 118, a fixing unit 120 and a paper output unit 122.

<<Paper Supply Unit>>

The paper supply unit 112 is a mechanism for supplying the recording medium 124 to the treatment liquid deposition unit 114, and the recording media 124, which can be cut sheets of paper, are stacked in the paper supply unit 112. A paper supply tray 150 is arranged in the paper supply unit 112, and the recording medium 124 is supplied one sheet at a time to the treatment liquid deposition unit 114 from the paper supply tray 150.

<<Treatment Liquid Deposition Unit>>

The treatment liquid deposition unit 114 is a mechanism for depositing the treatment liquid onto a recording surface of the recording medium 124. The treatment liquid includes a coloring material aggregating agent, which aggregates the coloring material (in the present embodiment, the pigment) in the ink deposited by the image formation unit 116, and the separation of the ink into the coloring material and the solvent is promoted due to the treatment liquid and the ink making contact with each other.

As shown in FIG. 2, the treatment liquid deposition unit 114 includes a paper supply drum 152, a treatment liquid drum 154 and a treatment liquid application device 156. The treatment liquid drum 154 holds and conveys the recording medium 124 so as to rotate. The treatment liquid drum 154 has a hook-shaped holding device (gripper) 155 arranged on the outer circumferential surface thereof, and is configured to hold the leading end of the recording medium 124 by gripping the recording medium 124 between the hook of the gripper 155 and the circumferential surface of the treatment liquid drum 154.

The treatment liquid application device 156 is arranged to face the circumferential surface of the treatment liquid drum 154. The treatment liquid application device 156 includes: a treatment liquid vessel, in which the treatment liquid is stored; an anilox roller, which is partially immersed in the treatment liquid in the treatment liquid vessel; and a rubber roller, which transfers a dosed amount of the treatment liquid to the recording medium 124, by being pressed against the anilox roller and the recording medium 124 on the treatment liquid drum 154. The treatment liquid application device 156 can apply the treatment liquid to the recording medium 124 while dosing the amount of the treatment liquid.

The recording medium 124 onto which the treatment liquid has been deposited in the treatment liquid deposition unit 114 is transferred from the treatment liquid drum 154 to the image formation drum 170 of the image formation unit 116 through an intermediate conveyance unit 126.

<<Image Formation Unit>>

The image formation unit 116 includes an image formation drum 170, a paper pressing roller 174, and the inkjet heads 172M, 172K, 172C and 172Y. Similarly to the treatment liquid drum 154, the image formation drum 170 has a hook-shaped holding device (gripper) 171 on the outer circumferential surface thereof. The recording medium 124 held on the image formation drum 170 is conveyed with the recording surface thereof facing to the outer side, and the inks are deposited onto the recording surface from the inkjet heads 172M, 172K, 172C and 172Y.

It is desirable that the inkjet heads 172M, 172K, 172C and 172Y are full-line type inkjet recording heads (inkjet heads) having a length corresponding to the maximum width of the image forming region on the recording medium 124. A row of nozzles for ejecting droplets of the ink arranged over the whole width of the image forming region is formed in the ink ejection surface of each of the inkjet heads 172M, 172K, 172C and 172Y. The inkjet heads 172M, 172K, 172Y and 172Y are disposed so as to extend in a direction perpendicular to the conveyance direction of the recording medium 124 (the direction of rotation of the image formation drum 170).

When droplets of the corresponding colored ink are ejected and deposited from each of the inkjet heads 172M, 172K, 172C and 172Y to the recording surface of the recording medium 124, which is held tightly on the image formation drum 170, the deposited ink makes contact with the treatment liquid, which has previously been deposited on the recording surface by the treatment liquid deposition unit 114, the coloring material (pigment) dispersed in the ink is aggregated, and a coloring material aggregate is thereby formed. Thereby, flowing of the coloring material, and the like, on the recording medium 124 is prevented and an image is formed on the recording surface of the recording medium 124.

The recording medium 124 onto which the image has been formed in the image formation unit 116 is transferred from the image formation drum 170 to a drying drum 176 of the drying unit 118 through an intermediate conveyance unit 128.

<<Drying Unit>>

The drying unit 118 is a mechanism for drying the solvent which has been separated by the action of aggregating the coloring material, and as shown in FIG. 2, includes the drying drum 176 and a solvent drying device 178.

Similarly to the treatment liquid drum 154, the drying drum 176 has a hook-shaped holding device (gripper) 177 arranged on the outer circumferential surface thereof, in such a manner that the leading end of the recording medium 124 can be held by the holding device 177.

The solvent drying device 178 is arranged to face the outer circumferential surface of the drying drum 176, and includes a plurality of halogen heaters 182 and a hot air spraying nozzle 180 disposed between the heaters 182.

The recording medium 124 on which a drying process has been carried out in the drying unit 118 is transferred from the drying drum 176 to a fixing drum 184 of the fixing unit 120 through an intermediate conveyance unit 130.

<<Fixing Unit>>

The fixing unit 120 includes the fixing drum 184, a halogen heater 186, a fixing roller 188 and an in-line sensor 190. Similarly to the treatment liquid drum 154, the fixing drum 184 has a hook-shaped holding device (gripper) 185 arranged on the outer circumferential surface thereof, in such a manner that the leading end of the recording medium 124 can be held by the holding device 185.

By means of the rotation of the fixing drum 184, the recording medium 124 is conveyed with the recording surface facing to the outer side, and preliminary heating by the halogen heater 186, a fixing process by the fixing roller 188 and inspection by the in-line sensor 190 are carried out in respect of the recording surface.

In the fixing unit 120, thermoplastic resin particles in the thin image layer formed by the drying unit 118 are heated, pressed and melted by the fixing roller 188, and thereby the image layer can be fixed to the recording medium 124. By setting the surface temperature of the fixing drum 184 to not lower than 50° C., drying is promoted by heating the recording medium 124 held on the outer circumferential surface of the fixing drum 184 from the rear surface, and therefore breaking of the image during the fixing process can be prevented, and furthermore, the strength of the image can be increased by the effects of the increased temperature of the image.

In cases where an ultraviolet-curable monomer is contained in the inks, after the solvent has been evaporated off sufficiently in the drying unit, the image is irradiated with ultraviolet light in the fixing unit including an ultraviolet irradiation lamp, and it is thereby possible to cure and polymerize the ultraviolet-curable monomer and improve the strength of the image.

<<Paper Output Unit>>

As shown in FIG. 2, the paper output unit 122 is arranged subsequently to the fixing unit 120. The paper output unit 122 includes an output tray 192, and a transfer drum 194, a conveyance belt 196 and a tensioning roller 198 arranged between the output tray 192 and the fixing drum 184 of the fixing unit 120 so as to oppose same. The recording medium 124 is sent to the conveyance belt 196 by the transfer drum 194 and output to the output tray 192.

Furthermore, although not shown in FIG. 2, the inkjet recording apparatus 100 in the present embodiment includes, in addition to the composition described above, an ink storing and loading unit, which supplies the inks to the inkjet heads 172M, 172K, 172C and 172Y, and a device which supplies the treatment liquid to the treatment liquid deposition unit 114, as well as including a head maintenance unit, which carries out cleaning (nozzle surface wiping, purging, nozzle suction, and the like) of the inkjet heads 172M, 172K, 172C and 172Y, a position determination sensor, which determines the position of the recording medium 124 in the paper conveyance path, a temperature sensor, which determines the temperature of the respective units of the apparatus, and the like.

Although the inkjet recording apparatus based on the drum conveyance system is described with reference to FIG. 2, the present invention is not limited to this and can also be used in an inkjet recording apparatus based on a belt conveyance system, or the like.

<Structure of Inkjet Head>

Next, the structure of the inkjet heads 172M, 172K, 172C and 172Y is described. Here, the respective inkjet heads 172M, 172K, 172C and 172Y have the same structure, and any of the heads is hereinafter denoted with a reference numeral 250 and described.

Figure 3A:
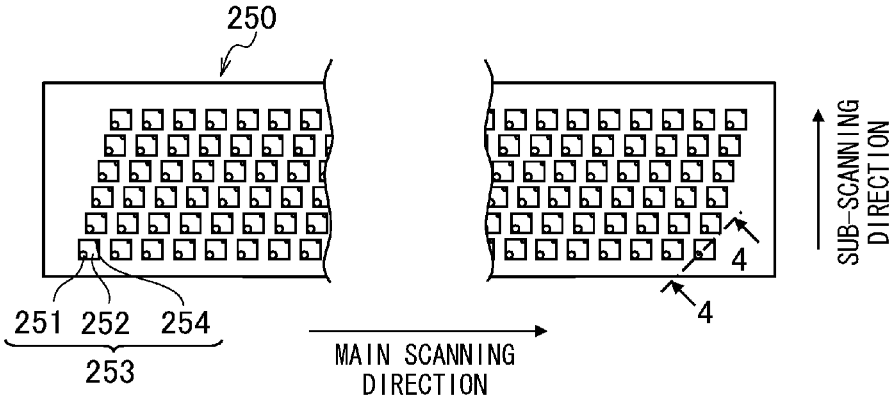
FIGS. 3A and 3B are plan view perspective diagrams showing examples of the structures of inkjet heads.
Figure 3B:
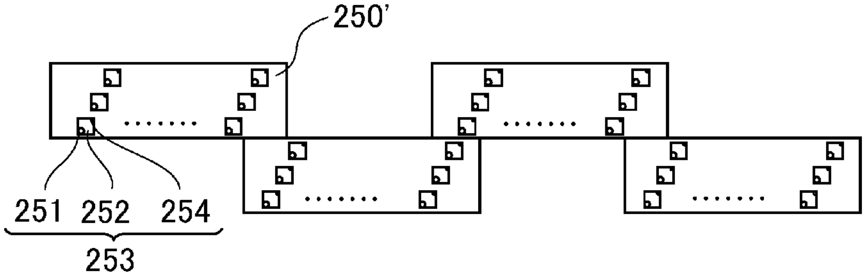
Figure 4:
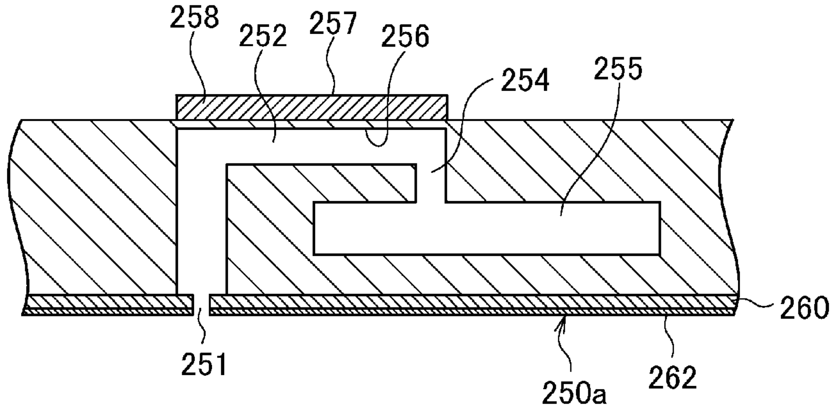
FIG. 4 is a cross-sectional diagram along line 4-4 in FIG. 3A.

FIG. 3A is a plan view perspective drawing showing an example of a structure of the inkjet head 250, and FIG. 3B is a plan view perspective drawing showing another example of a structure of the inkjet head 250. FIG. 4 is a cross-sectional diagram taken along line 4-4 in FIG. 3A and shows the inner structure of an ink chamber unit.

In order to achieve a high density of the dots formed with the ink droplets on the surface of the recording paper, it is necessary to achieve a high density of the nozzles by reducing the nozzle pitch in the inkjet head 250. As shown in FIG. 3A, the inkjet head 250 in the present embodiment has a structure in which a plurality of ink chamber units 253 are arranged in a staggered matrix configuration (two-dimensional configuration). Each of the ink chamber units 253 includes a nozzle 251 serving as an ink droplet ejection aperture, a pressure chamber 252 corresponding to the nozzle 251, and the like. Accordingly, the high density of the nozzles is achieved by reducing the effective nozzle pitch or the projected nozzle pitch projected to an alignment in the lengthwise direction of the inkjet head 250 along the main scanning direction, which is perpendicular to the sub-scanning direction or the paper conveyance direction.

The arrangement of one or more nozzle rows covering the length corresponding to the full width of the recording medium 124 in the direction substantially perpendicular to the paper conveyance direction is not limited to the arrangement shown in FIG. 3A. For example, instead of the composition in FIG. 3A, a line head having nozzle rows of the length corresponding to the entire width of the recording medium 124 can be formed by arranging and combining, in a staggered matrix, short head blocks (head chips) 250' each having the nozzles 251 arrayed two-dimensionally, as shown in FIG. 3B. Furthermore, although not shown in the drawings, it is also possible to form a line head by aligning short heads in a single row.

As shown in FIG. 4, each of the nozzles 251 is formed in a nozzle plate 260, which constitutes an ink ejection surface 250*a* of the inkjet head 250. The nozzle plate 260 can be made of a silicon material, such as Si, $SiO_2$, SiN or quartz glass, a metal material such as Al, Fe, Ni, Cu or an alloy of these, an oxide material such as alumina or iron oxide, a carbonaceous material such as carbon black or graphite, or a resin material such as polyimide.

A water repellent film 262 having repellent properties with respect to the ink is formed on the surface (ink ejection side surface) of the nozzle plate 260, to prevent adherence of the ink on the ink ejection surface.

Each of the pressure chambers 252, which are provided correspondingly to the nozzles 251, is formed with a substantially square planar shape, and the nozzle 251 and a supply port 254 are arranged in the respective corner portions on a diagonal of this planar shape. The respective pressure chambers 252 connect with a common flow channel 255 through the supply ports 254. The common flow channel 255 is connected to an ink supply tank (not shown) serving as an ink supply source, and the ink supplied from the ink supply tank is distributed through the common flow channel 255 to the pressure chambers 252.

Piezoelectric elements 258 each having individual electrodes 257 are bonded to the diaphragm 256, which constitutes ceiling faces of the pressure chambers 252 and also serves as a common electrode for the piezoelectric elements 258. Each piezoelectric element 258 is deformed by applying a drive voltage to the individual electrode 257, thereby causing the ink in the corresponding pressure chamber 252 to be ejected from the nozzle 251. When the ink is ejected, new ink is supplied to the pressure chamber 252 from the common flow channel 255 through the supply port 254.

The arrangement structure of the nozzles is not limited to the examples shown in the drawings, and it is also possible to apply various other types of nozzle arrangements, such as an arrangement structure having a single nozzle row in the sub-scanning direction.

The print method is not limited to using the line type heads, and can be a serial method in which printing is performed in the widthwise direction of the recording medium 124 (the main scanning direction) by employing a short head that is shorter than the dimension of the recording medium 124 in the widthwise direction and performing a scanning action of the short head in the widthwise direction, and after completing one printing action in the widthwise direction, the recording medium 124 is moved by a prescribed amount in the sub-scanning direction perpendicular to the widthwise direction, printing in the widthwise direction of the recording medium 124 is performed on the next print region, and by repeating this operation, printing is performed over the whole of the printing area of the recording medium 124.

EXAMPLES

Specifying Film Formation Temperature

Figure 5:
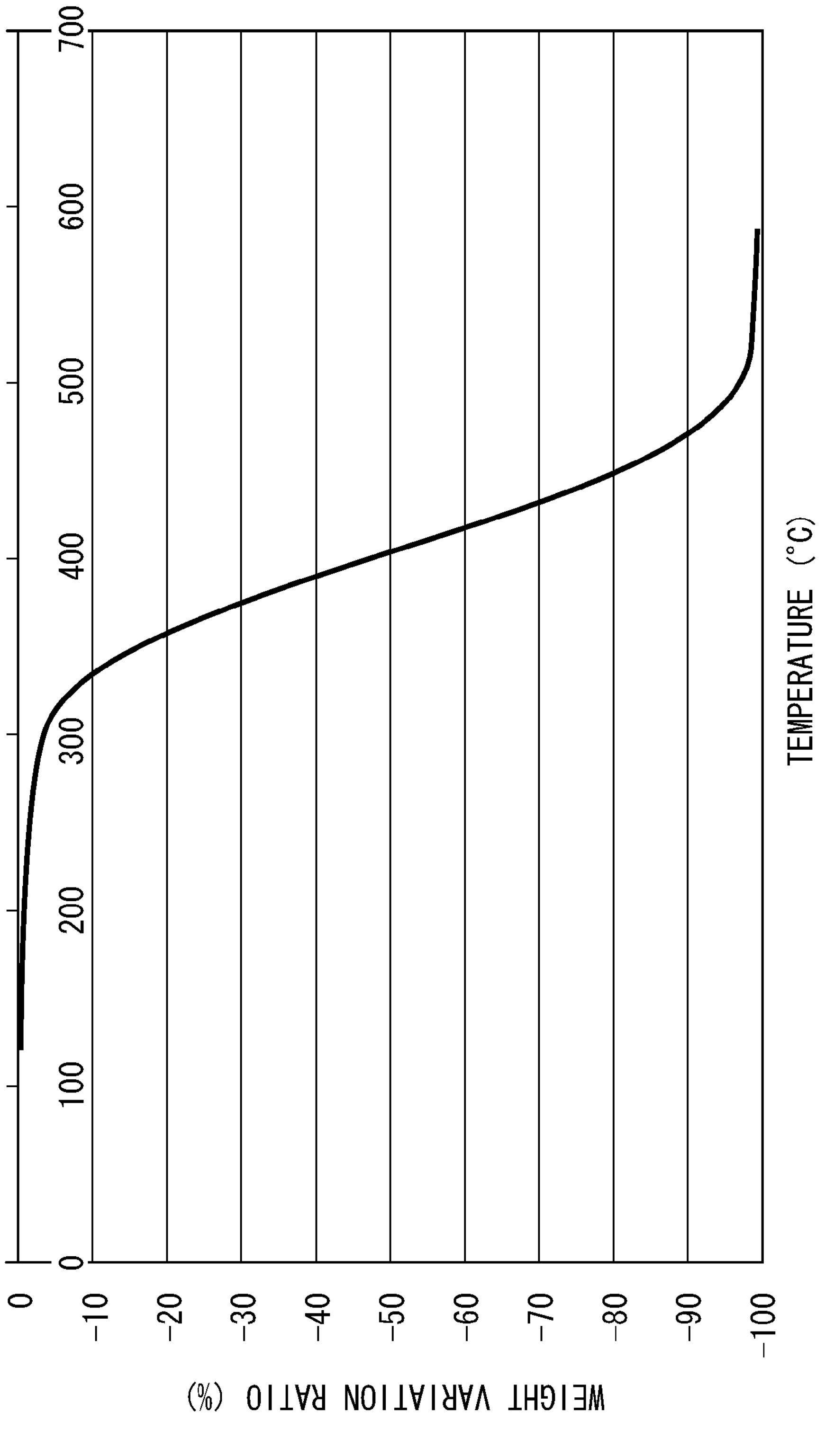
FIG. 5 is a diagram showing TG data for the water repellent material.

Optool DSX (20 wt %) made by Daikin was dripped onto a TG-DTA measurement unit, and it was waited at room temperature until weight decrease terminated. Perfluoro hexane, which occupies 80 wt % of the Optool DSX, was evaporated off and the water repellent material only was left on the TG-DTA measurement unit, whereupon the measurement unit was heated at a rate of 10° C./min and TG data was obtained. FIG. 5 shows the obtained TG data. As shown in FIG. 5, the temperature at which the weight decrease became 10% was 300° C. and the temperature at which the weight decrease became 90% was 470° C.

Comparative Example 1

Tetra ethoxy silane (TEOS) was supplied by thermal vaporization to a 6-inch silicon substrate, using a SAMCO plasma CVD apparatus, and a $SiO_2$ film was formed to 200 nm on the surface of the silicon substrate. Thereupon, the surface was cleaned by irradiating light for 30 minutes in a normal atmosphere, by using a low-pressure mercury lamp made by Sen Lights Corporation.

The $Si/SiO_2$ substrate formed as described above was then placed on a substrate holder of a vapor phase deposition apparatus. Then, 50 μl of Optool DSX (20 wt %) was then measured out with an Eppendorf pipette and dripped onto the vapor phase deposition heating unit. When the heating unit was heated to 250° C., a water repellent film was not formed sufficiently even after 2 hours or more had elapsed. Furthermore, it was confirmed by optical microscopic observation that no beads of surplus water repellent material were formed. It was confirmed that, under the low temperature conditions, the water repellent film is not formed sufficiently, even if a large amount of time is allowed.

Comparative Examples 2 and 3

A $Si/SiO_2$ substrate was prepared by the similar method to Comparative Example 1 and was set in the vapor phase deposition apparatus. The temperature of the vapor phase deposition source was 600° C. The water repellent material had the similar weight to Comparative Example 1, but in order to prevent the heated water repellent material from bumping, alumina boiling chips were placed in the vapor phase deposition heating unit and the water repellent material was added dropwise so as to wet the alumina boiling chips. If boiling chips were not used, then the heated water repellent material bumped and the heating unit became soiled. When the film formation duration was set to 2 minutes (including the time until reaching 600° C., the same applies hereinafter) (Comparative Example 2), then the static contact angle of water with respect to the formed film was 105°, and the substrate was not coated sufficiently with the water repellent film. When the film formation duration was 3 minutes (Comparative Example 3), then the static contact angle of water with respect to the formed film was 113°, but beads of the surplus water repellent material were formed.

Moreover, as reference examples, formation of a water repellent film was carried out five times using a film formation duration of 2 minutes and 30 seconds, which was intermediate between the film formation durations in Comparative Example 2 and Comparative Example 3. However, either the coating was insufficient with the static contact angle of water smaller than 110°, or beads of the surplus water repellent material were formed, and in either case, the film formation was not stable.

In Comparative Examples 2 and 3, an ink immersion test, a wiping test and a nozzle blockage test were carried out.

<<Ink Immersion Test>>

The substrate having the water repellent film was immersed in an alkaline ink at 60° C. for a prescribed time. The static contact angle of water with respect to the water repellent film after the ink immersion was measured. The water repellent film of which the time taken for the static contact angle to become smaller than 70° was not shorter than 400 hours was judged to be of a level capable of withstanding practical use.

<<Wiping Test>>

Toraysee cloth made by Toray was set in a jig and pressed against the water repellent film on the silicon substrate at a uniform pressure, a rubbing test was then carried out, and the static contact angle of water with respect to the rubbed water repellent film was measured after every 1000 rubbing actions. A linear interpolation was carried out with respect to the numbers of rubbing actions between which the static contact angle of water became smaller than 70°, and the number of rubbing actions until the static contact angle of water became 70° was taken to be the wiping lifespan (for example, if the static contact angle of water was 80° after 2000 wipes and 60° after 3000 wipes, then the lifespan was taken to be 2500 wipes). The water repellent film of which the wiping lifespan was not less than 2000 times was judged to be of a level capable of withstanding practical use.

The results are shown in Table 1 below.

TABLE 1

| | Static contact angle upon film formation | Bead of surplus water repellent material | Static contact angle after ink immersion | Wiping lifespan |
|---|---|---|---|---|
| Comparative Example 2 | 108° | Not formed | Becoming smaller than 70° after 24 hours | 1200 wipes |
| Comparative Example 3 | 113° | Formed | No change after 1000 hours | 6200 wipes |

In the ink immersion test, the water repellent film in Comparative Example 2 showed a decline in the static contact angle of water to 70° after 24 hours, whereas the water repellent film in Comparative Example 3 had no decline in the static contact angle of water observed even after immersion for 1000 hours. Furthermore, in the wiping test, the water repellent film in Comparative Example 3 had the good wiping life span of 6200 wiping actions.

<<Nozzle Blockage Test>>

Thereupon, the nozzle blockage test was carried out on the films with and without the beads of the surplus water repellent material. The nozzle blockage test involved wiping the nozzle face about 10 times and then checking the nozzles by an ejection test. Normal ejection was able to be performed in the case of the film without the beads of the surplus water repellent material, but in the case of the film with the beads of the surplus water repellent material, ejection failure occurred, and optical microscopic inspection revealed blockages of the nozzles with the material. In Comparative Example 3, it was possible to achieve good results in the ink immersion test and the wiping test, but since the beads of the surplus water repellent material were formed, the nozzle blockages occurred in the nozzle blockage test.

Furthermore, in the samples having the film formation duration of 2.5 minutes, when the vapor phase deposition temperature of 600° C. was used, it was not possible to form the same water repellent films even using the identical film formation duration. This is thought to be because when a film is formed at a high vapor phase deposition temperature, the formation of a monomolecular film and the formation of the beads of the surplus water repellent material on the monomolecular film proceed simultaneously.

In this way, at the vapor phase deposition temperature of 600° C., it was not possible to form a water repellent film that was free of beads of the surplus water repellent material and able to withstand the ink immersion test and the wiping test.

Comparative Example 4

A $Si/SiO_2$ substrate was prepared by the similar method to Comparative Example 1 and was set in the vapor phase deposition apparatus. The vapor phase deposition temperature was 500° C. and since no bumping of the heated water repellent material was observed, then there was no soiling of the heating unit and a film was formed without using boiling chips.

However, similarly to Comparative Examples 2 and 3, it was not possible to obtain the static contact angle of water of not smaller than 110° with a film formation duration of 3 minutes, and beads of the surplus water repellent material were formed with a film formation duration of 4 minutes. Furthermore, even if the film formation duration was set to 3 minutes and 30 seconds, it still was not possible to form the same film each time.

Practical Example 1 and Comparative Examples 5 and 6

A $Si/SiO_2$ substrate was prepared by the similar method to Comparative Example 1 and was set in the vapor phase deposition apparatus. Film formation was implemented, with the vapor phase deposition temperature of 450° C. and the film formation duration of 3 minutes (Comparative Example 6), 4 minutes (Practical Example 1) and 5 minutes (Comparative Example 7). The results are shown in Table 2 below.

TABLE 2

| | Film formation duration | Static contact angle upon film formation | Bead of surplus water repellent material | Static contact angle after ink immersion | Wiping lifespan |
|---|---|---|---|---|---|
| Comparative Example 5 | 3 minutes | 106° | Not formed | Becoming smaller than 70° after 24 hours | 1500 wipes |
| Practical Example 1 | 4 minutes | 113° | Not formed | Becoming smaller than 70° after 400 hours | 2800 wipes |
| Comparative Example 6 | 5 minutes | 114° | Formed | Becoming smaller than 70° after 600 hours | 4100 wipes |

In Comparative Example 5 having the short film formation duration, the static contact angle of water was 105°, and it was not possible to form a film having sufficient water repellent properties. In Comparative Example 6 having the long film formation duration, it was envisaged that beads of the surplus water repellent material adhered to the surface and nozzle blockages occurred. By setting the film formation duration to 4 minutes, no bead of the surplus water repellent material was observed and a film of good quality having the static contact angle of water of not smaller than 110° was able to be obtained stably.

Practical Examples 2 to 4 and Comparative Examples 7 and 8

A $Si/SiO_2$ substrate was prepared by the similar method to Comparative Example 1 and was set in the vapor phase deposition apparatus. Film formation was implemented, with the vapor phase deposition temperature of 400° C. and the film formation duration of 5 minutes (Comparative Example 7), 10 minutes (Practical Example 2), 20 minutes (Practical Example 3), 30 minutes (Practical Example 4) and 40 minutes (Comparative Example 8). The results are shown in Table 3 below.

TABLE 3

| | Film formation duration | Static contact angle upon film formation | Bead of surplus water repellent material | Static contact angle after ink immersion | Wiping lifespan |
|---|---|---|---|---|---|
| Comparative Example 7 | 5 minutes | 108° | Not formed | Becoming smaller than 70° after 24 hours | 1400 wipes |
| Practical Example 2 | 10 minutes | 113° | Not formed | Becoming smaller than 70° after 400 hours | 2400 wipes |

TABLE 3-continued

| | Film formation duration | Static contact angle upon film formation | Bead of surplus water repellent material | Static contact angle after ink immersion | Wiping lifespan |
|---|---|---|---|---|---|
| Practical Example 3 | 20 minutes | 115° | Not formed | Becoming smaller than 70° after 700 hours | 4800 wipes |
| Practical Example 4 | 30 minutes | 114° | Not formed | No change after 1000 hours | 6100 wipes |
| Comparative Example 8 | 40° minutes | 114° | Formed | No change after 1000 hours | 5800 wipes |

When the vapor phase deposition temperature was 400° C., in Practical Examples 2 to 4 which had the film formation duration of 10 minutes to 30 minutes, there was no bead of the surplus water repellent material, and the film of good quality having the static contact angle of water of not smaller than 110° was obtained.

In particular, in Practical Example 4, it was possible to obtain the film having excellent performance in the ink immersion test and the wiping test. Good results in the ink immersion test and the wiping test were obtained in Comparative Example 3, but due to the presence of the beads of the surplus water repellent material, the occurrence of nozzle blockages was envisaged. In Practical Example 4, good results were obtained in the ink immersion test and the wiping test, there was no bead of the surplus water repellent material, and the water repellent film having a densely deposited monomolecular film was formed. Conversely, in Comparative Example 6, even though the beads of the surplus water repellent material were present, neither the ink immersion resistance nor the wiping resistance were good, and it is considered that the beads of the surplus water repellent material adhered to the surface before the surface was coated completely with the monomolecular film.

From the foregoing, it can be confirmed that, if the film formation temperature is low, then a water repellent film having sufficient water repellent properties is not formed, and if the film formation temperature is high, then although a water repellent film having sufficient water repellent properties is formed, beads of the surplus water repellent material are liable to form and therefore nozzle blockages are liable to occur. Consequently, by employing the vapor phase deposition temperature of the water repellent film in the prescribed range according to the embodiments of the present invention, it is possible to form a good water repellent film.

Moreover, if the film formation duration is short, then a water repellent film having sufficient water repellent properties is not formed, and if the film formation duration is long, beads of the surplus water repellent material are formed over the water repellent film and cause nozzle blockages. Therefore, it is desirable to terminate the formation of the water repellent film before beads of the surplus water repellent material are formed. Furthermore, within these film formation durations, the longer the film formation duration, the higher the density of the monomolecular film that can be formed.

<<Roll-Off Properties Test>>

A 10 μl droplet of pure water was deposited on the water repellent film coating the substrate placed on a horizontal stage, and the angle at which the droplet started to roll-off down upon tilting the stage was measured. A plurality of films were manufactured under the temperature conditions in the above-described Practical Examples and Comparative Examples, and a comparison was made on the basis of the presence or absence of the beads of the surplus water repellent material.

With the water repellent films having the static contact angles of water of smaller than 110°, the water droplets did not roll-off down even when the stage was tilted through 80°. It is surmised that this is because the coating with the water repellent film is insufficient and the water is trapped by the hydrophilic groups of the substrate.

The water repellent films having no beads of the surplus water repellent material and having the static contact angles of water of not smaller than 110° exhibited the roll-off angles of 10° to 20°, and were confirmed to have good dynamic water repellent properties.

The water repellent films having the beads of the surplus water repellent material exhibited the roll-off angles of not smaller than 30° in any of the cases. In particular, with the water repellent film in Comparative Example 3, the water droplet did not roll-off down even when the stage was tilted through 80°.

It was confirmed that, by forming the water repellent film under the conditions where no beads of the surplus water repellent material are formed, beneficial effects were obtained in relation to the droplet roll-off properties (dynamic water repellent properties).

Figure 6:
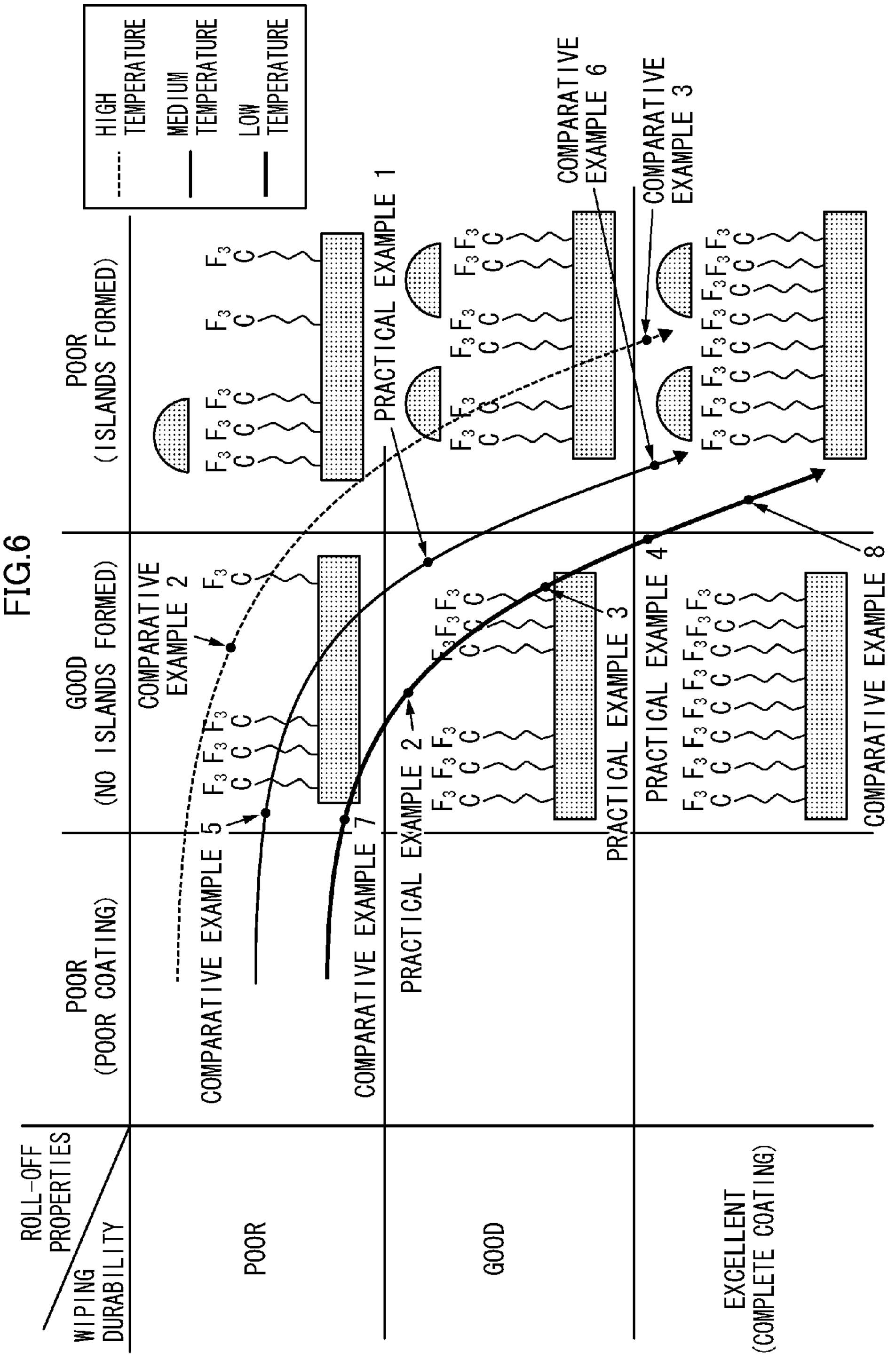
FIG. 6 is a diagram illustrating states of water repellent films with respect to the film formation temperature and duration.

FIG. 6 shows the states of the films formed at the high, medium and low film formation temperatures, where the film formation duration is plotted on the horizontal axis. FIG. 6 is a schematic drawing showing the states of the films with respect to the film formation duration at each temperature, in which the film formation duration varies with the temperature.

As shown in FIG. 6, if the temperature is high (600° C. and 500° C.), beads of the surplus water repellent material are formed in a state where a monomolecular film is not formed densely and sufficient wiping resistance is not obtained. If the film formation is continued further, the film formed with the beads of the surplus water repellent material is obtained although the wiping resistance becomes high. Consequently, if the temperature is high, then it is not possible to obtain the film in which the monomolecular film is deposited densely without the formation of beads of the surplus water repellent material.

In the case of the medium temperature (450° C.), if the film formation duration is short, then the water repellent film having the low density is produced and by increasing the film formation duration, it is possible to deposit the film having good wiping durability, without the formation of beads of the surplus water repellent material. However, if the film formation is continued in this state, then beads of the surplus water repellent material are formed before the substrate surface is coated completely with the water repellent film.

If the temperature is low (400° C.), it is possible to deposit the monomolecular film densely at the prescribed duration, and the substrate can be coated completely with the water repellent film before beads of the surplus water repellent material are formed. Nevertheless, by continuing the film formation in this state, beads of the surplus water repellent material are formed. Therefore, by terminating the film formation after the prescribed duration, it is possible to manufacture the water repellent film having high wiping durability and high chemical resistance, and on which no bead of the water repellent material is formed.

As described above, it is possible to deposit the water repellent film having good water repellent properties, chemical resistance and wiping resistance, by setting the film formation temperature to be lower than the temperature at which the bumping of the heated water repellent material occurs, and desirably, to be the temperature at which the weight decrease of the water repellent material is not less than 10% and not more than 90% when the temperature of the water repellent material is raised at a rate of 10° C. per minute. However, if the film formation duration is long, then beads of the surplus water repellent material are formed on the surface of the water repellent film, and the beads of the surplus water repellent material are readily separated by wiping and cause nozzle blockages. Therefore, by considering terminating the film formation before the beads of the surplus water repellent material are formed, it is possible to specify the film formation conditions which produce good properties and which do not give rise to nozzle blockages.

In the thus formed water repellent films, the film formation duration can be shortened in the cases of the water repellent films having relatively low immersion resistance and relatively low wiping resistance as in Practical Examples 2 and 3, for example, and therefore the productivity is high and the water repellent films can be used as disposable members. Furthermore, the water repellent film having high ink immersion resistance and high wiping resistance as in Practical Example 4 can be used as a durable member.

It should be understood that there is no intention to limit the invention to the specific forms disclosed, but on the contrary, the invention is to cover all modifications, alternate constructions and equivalents falling within the spirit and scope of the invention as expressed in the appended claims.

What is claimed is:

1. A method of manufacturing a water repellent film, comprising:

an organic film formation step of forming an organic film on a substrate using a silane coupling agent by a vapor phase deposition method under film formation conditions comprising film formation temperature and film formation duration; and before the organic film formation step, a film formation condition specifying step of specifying the film formation conditions using a test substrate of a same material as the substrate used in the organic film formation step, wherein the film formation condition specifying step comprises:

a film formation temperature specifying step of specifying the film formation temperature to be not lower than a temperature at which the silane coupling agent evaporates and to be lower than a temperature at which the silane coupling agent bumps; and a film formation duration specifying step of forming an organic film of the silane coupling agent on the test substrate at the film formation temperature specified in the film formation temperature specifying step, measuring by optical microscopic observation a time at which a bead of surplus water repellent material is formed, and specifying the film formation duration to be shorter than the measured time, wherein the film formation temperature specified in the film formation temperature specifying step is a temperature at which weight decrease of the silane coupling agent is not less than 10% and not more than 90% in thermogravimetric and differential thermal analysis measurement in which the temperature of the silane coupling agent is raised at a rate of 10° C. per minute.

2. The method as defined in claim 1, wherein the film formation temperature specified in the film formation temperature specifying step is a temperature at which weight decrease of the silane coupling agent is not less than 20% and not more than 80% in thermogravimetric and differential thermal analysis measurement in which the temperature of the silane coupling agent is raised at a rate of 10° C. per minute.

3. The method as defined in claim 1, wherein in the film formation duration specifying step, a static contact angle of water with respect to the organic film formed on the test substrate is measured, and the film formation duration is specified to be not shorter than a time at which the measured static contact angle is not smaller than 110°.

4. The method of as defined in claim 1, wherein in the film formation duration specifying step, the film formation duration is specified to be a time immediately before the time at which the bead of surplus water repellent material is formed.

5. The method as defined in claim 1, further comprising, after the organic film formation step, a storing step of storing the substrate for a time not shorter than one week before use.

6. The method as defined in claim 5, wherein in the storing step, the substrate is stored while controlling environmental temperature and humidity.

7. The method as defined in claim 1, further comprising, after the organic film formation step, a storing step of storing the substrate for a time not shorter than two weeks before use.

* * * * *